United States Patent [19]
Bullock

[11] Patent Number: 5,320,879
[45] Date of Patent: Jun. 14, 1994

[54] METHOD OF FORMING COATINGS BY PLASMA SPRAYING MAGNETIC-CERMENT DIELECTRIC COMPOSITE PARTICLES

[75] Inventor: Ronald E. Bullock, Cardiff, Calif.

[73] Assignee: Hughes Missile Systems Co., Los Angeles, Calif.

[21] Appl. No.: 916,446

[22] Filed: Jul. 20, 1992

[51] Int. Cl.$^5$ .............................................. B55D 5/12
[52] U.S. Cl. ..................... 427/576; 427/579; 427/128; 427/129; 427/131; 427/290; 427/292; 427/299; 427/419.3; 427/422; 427/427
[58] Field of Search ............... 427/576, 579, 422, 427, 427/128, 129, 131, 132, 290, 299, 376.3, 292, 419.3

[56] References Cited
U.S. PATENT DOCUMENTS
4,328,257  5/1982  Muehlberger .................. 427/576

Primary Examiner—Janyce Bell

[57] ABSTRACT

A method of forming high temperature resistant coatings from a quantity of composite particles, each comprising very small magnetic particles in a ceramic matrix by plasma spraying the composite particles onto a surface. Typically, the surface to be coated is pretreated by a combination of solvent cleaning and abrasion, such as by grit blasting. In some cases the surface is coated with a thin electrically conductive transition layer having a coefficient of thermal expansion intermediate those of the surface and the composite coating. A quantity of finely divided composite particles are then prepared, each of the particles comprising a ceramic matrix containing plural spaced very small magnetic metal particles. In some cases, a small quantity of smaller pure matrix particles or lower melting particles are mixed with the composite particles to improve bonding. The composite particles are plasma sprayed onto the surface to be coated at temperatures such that only the surfaces of the composite particles are melted, thereby permitting higher magnetic material loadings without forming an excessively electrically conductive coating. The resulting coating is durable, has high temperature resistance and absorbs incident microwave energy.

16 Claims, 2 Drawing Sheets

METHOD OF FORMING COATINGS BY PLASMA SPRAYING MAGNETIC-CERMENT DIELECTRIC COMPOSITE PARTICLES

BACKGROUND OF THE INVENTION

This invention relates in general to the formation of coatings by plasma spraying techniques, and more particularly, to the production of magnetic-cermet dielectric coatings by plasma spraying of composite particles.

In the past, magnetic-cermet dielectric coatings have been formed by coating a mixture of metal particles and ceramic particles in a liquid carrier onto a substrate, evaporating the liquid and heating the assembly in air to the sintering temperature of the ceramic for an hour or more. A dielectric layer results, with the metal particles sufficiently separated (by spacing or by in-situ formation of insulating oxide layers) so that the coating has sufficiently low electrical conductivity.

While suitable for some applications, this process has a number of disadvantages and problems. Parts to be coated are limited in size to the sizes of sintering furnaces available. Since the sintering temperature is quite high for a relatively long period (often over 800° C.), depending on the ceramic or glass frit employed, substrates such as polymeric materials or carbon—carbon composites that would be damaged at the sintering temperature in air cannot be used. Also, cooling from the sintering temperature may, where the coating and substrate have significant differences in coefficient of thermal expansion (CTE), cause cracking or delamination in the coating. Repair of damaged areas is difficult where the entire part must be exposed to the sintering conditions.

The ability to coat a variety of substrates of various sizes would expand the usefulness of magnetic-cermet dielectric coatings beyond the present microwave absorption uses. For example, microwave absorbing coatings on cookware and browning dishes for use in microwave ovens would benefit from the capability of induction heating at or near food surfaces. These coatings would have applications in induction heating coatings for industrial processes such as heat treatment of non-ferrous alloys. They also may find application in interference fit assembling, welding, brazing, etc. and in the production of magnetic coatings on non-ferrous alloy plates for computer memory disk drives. Because of their high temperature resistance, they will have applications as a microwave absorber for aircraft engine exhaust components and the like.

Thus, there is a continuing need for improved methods of forming magnetic-cermet dielectric coatings which overcome the above noted problems.

SUMMARY OF THE INVENTION

The above-noted problems, and others, are overcome in accordance with this invention by a method of forming a magnetic-dielectric coating on a substrate that basically comprises the steps of cleaning the surface to be coated, preparing a suitable mixture of magnetic metal particles and ceramic particles, and plasma spraying the particles onto the substrate under suitable conditions.

Where the substrate is a metal, it is preferred that a thin, strong transition layer be plasma sprayed onto the treated substrate to provide a more gradual transition between the higher coefficient of thermal expansion (CTE) of the substrate and the lower CTE of the dielectric layer. This intermediate transition layer is preferably about 5 to 7 mils thick and comprises a mixture of about 50 vol % each of the metal particles and the ceramic matrix material used to produce the composite particles used to produce the outer dielectric layer. However, unlike the outer dielectric layer, plasma spray conditions are selected to fully melt the mixed particles forming the transition layer. This produces a conductive transition layer interlaced with overlapping splatters of metal formed on impact of the molten spray droplets on the substrate. Such a transition layer will not normally be required for non-metallic substrates having a lower CTE such as carbon-carbon substrates.

Where a lower CTE substrate is used, but the final coated product is to be subjected to severe thermal cycling, bonding of the dielectric layer is often improved by providing a transition layer formed entirely from the ceramic matrix material.

Any suitable cleaning method may be used. For best results, a solvent cleaning of the surface, followed by abrasion is preferred. With carbon-carbon substrates and many other non-metallic materials, only the solvent wash followed by drying is generally satisfactory, with light sanding with a medium grade sandpaper desirable where the surface is polished or very smooth.

The composite particles comprise a dielectric ceramic matrix having a plurality of very small metal particles dispersed therethrough.

These particles are applied by any suitable plasma spraying method and apparatus, preferably at temperatures that only melt the surface of the particles during application.

BRIEF DESCRIPTION OF THE DRAWING

Details of the invention, and of certain preferred embodiments thereof, will be further understood upon reference to the drawing, wherein.

DETAILED DESCRIPTION OF PREFERRED EMBODIMENTS

Figure 1:
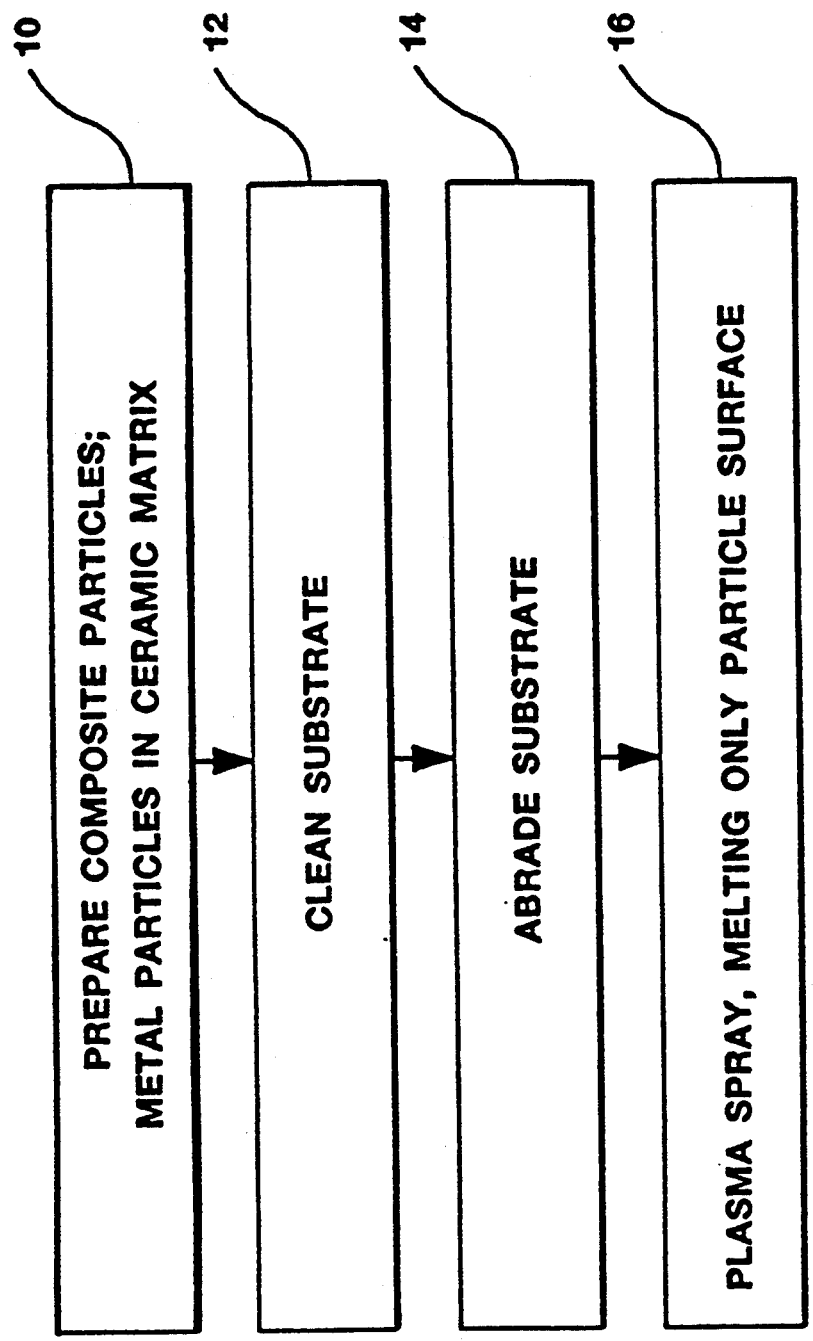
FIG. 1 is a block diagram outlining the steps of the method of this invention.

Referring now to FIG. 1, there is seen a block diagram illustration of the steps in a preferred embodiment of the method of this invention.

Initially, the composite particles are prepared, as indicated in Block 10. In one preferred embodiment, the particles to be applied comprise ceramic or glass particles having diameters of from about 60 to 75 micrometers and having finely divided, spaced, magnetic metal particles dispersed therethrough. Preferably, the metal particles have average diameters of from about 1 to 5 micrometers and comprise from about 50 to 75 vol % of the over-all particles.

The composite particles may be produced by any suitable process, such as a sol-gel process in which metal particles are dispersed in a gel of the ceramic material which is then hardened and sintered to produce the desired particles. In another method, a thin layer of the ceramic is produced in a glass-like form, very fine metal particles are spread across the surface and the ceramic is heated to its softening point, whereupon the metal particles disperse into the ceramic which is then cooled to a solid state. Additional layers of ceramic and metal particles may be applied and softened to produce a thicker layer. The composite is cooled and broken up, then ground and sieved to provide composite particles of the desired diameter range.

Any suitable dielectric ceramic material may be used. Typical ceramics include silicon dioxide, barium dioxide, boron oxide, calcium oxide, strontium oxide, aluminum oxide and mixtures thereof. Of these a mixture of the oxides of silicon, barium and boron is preferred in suitable proportions that produce a sprayed glassy material that will soften at a convenient working temperature of about 1000° C., which is near the maximum to which conventional super-alloy substrates may be subjected. The metal particles may be formed from any suitable magnetic metal. Typical metals include iron, iron-aluminum, iron-silicon, cobalt and mixtures thereof.

The substrate to be coated is then cleaned, as indicated in Block 12. Any suitable cleaning method may be used that produces a contaminate free surface. For best results, a solvent cleaning of the surface, followed by abrasion is preferred. For metal substrates, vapor degreasing followed by grit blasting of the surface, typically with 20 to 80 mesh alumina, and a final cleaning wash with a solvent that does not leave a residue, such as acetone, gives an optimum surface for applying the coating, or transition coating.

With smooth metal substrates that cannot be grit blasted and smooth, shiny carbon-carbon and organic resin matrix substrates, a uniform, fine abrasion of the substrate is preferred, as indicated in Block 14. For most metal substrates, grit blasting of the surface, typically with 20 to 80 mesh alumina is sufficient. A final rinse with a solvent, such as acetone, that does not leave a residue will remove any powder or other contaminants from the surface. With non-metallic substrates (which do not generally require a transition layer), such as organic resin matrix composites or carbon-carbon composites, only the solvent wash followed by drying is generally satisfactory, with light sanding with a medium grade sandpaper desirable where the surface is polished or very smooth.

The composite particles are applied onto the substrate by plasma spraying, as indicated in Block 16. Any suitable, conventional, plasma spraying apparatus may be used to form the magnetic-cermet dielectric coatings of this invention. Preferably, coating is conducted at a temperature that only melts the outer surface of the composite particles. Excessive melting may cause agglomeration of the metal particles in each composite particle or in the coating, causing excessively high conductivity in the coating. In selecting an optimum temperature for a particular combination of ceramic and metal, spraying can be done over a range of temperatures and spray conditions. A porous, poorly bonded, coating results from lower than optimum temperatures. Optimum temperatures and impact velocities produce a smooth coating with the desired dielectric properties. Excessively high temperatures produce coatings with poor dielectric properties. For optimum results, the spraying conditions and dielectric layer thickness are adjusted to produce a coating having maximum microwave absorption of from about 6 to 16 GHz.

Figure 2:
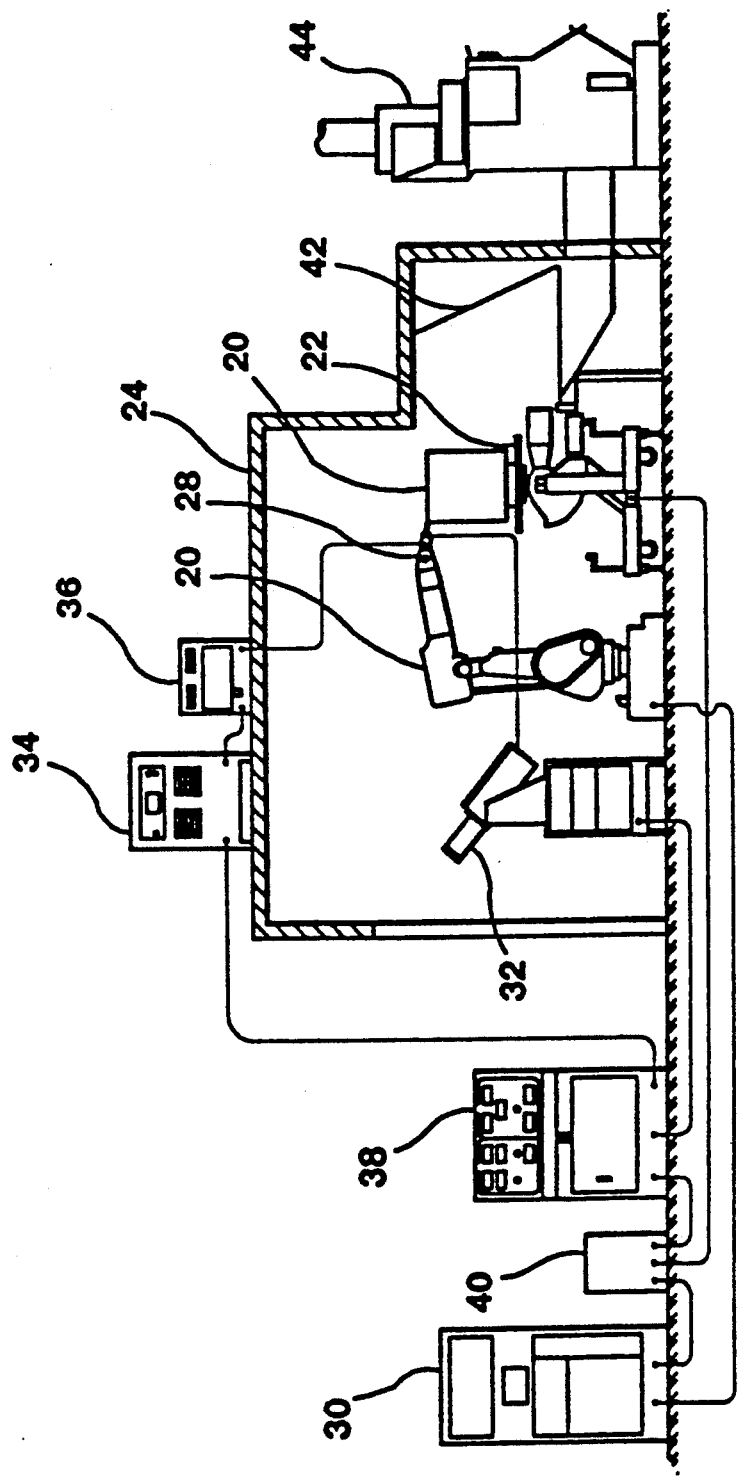
FIG. 2 is a schematic elevation view of apparatus for performing the method.

FIG. 2 provides a schematic elevation view of a preferred system for applying the magnetic-cermet dielectric coating. An object 20 is placed on a turntable 22 in an enclosure 24. A robotic arm 26 carries a plasma gun 28. Arm 26 and turntable 20 are controlled by conventional software at controller 30 to move plasma gun 28 over the surface to be coated in a prescribed pattern. Plasma gun 28 and powder feeder 32 are operated under control of a power supply 34, high frequency unit 36 and control console 38 which is connected to the robotic controller 30 through an interface unit 40. Any overspray from plasma gun 28 is caught in spray hood 42 and collected in dust collector 44.

Details of the process of this invention, and of certain preferred embodiments, will be further understood upon reference to the following examples.

EXAMPLE I

Composite particles having fine metal particles in a dielectric ceramic matrix are first prepared. A mixture of about 45 wt % silicon dioxide, about 46 wt % barium oxide and about 9 wt % boron oxide is plasma sprayed onto a surface to a thickness of about 0.5 mil. Particles of an alloy containing 90 wt % iron and 10 wt % aluminum with average diameters of from about 3 micrometers are spread over the glassy ceramic surface. The ceramic is quickly heated to about 1000° C. and held there just long enough for the ceramic surface to soften and permit the metal particles to sink into the protective ceramic before significant oxidation occurs. The plasma spraying, metal particle application and heating steps are repeated 5 additional times to form a final thickness of about 3 mils. The resulting metal-ceramic composite is removed from the surface and ground and sieved to an average particle diameter of about 60 micrometers.

A sheet of Inconel 625 alloy is degreased with 1,1,1-trichloroethane for about 5 min. One surface is then grit blasted with a mixture of 20 to 80 micrometer alumina particles for about 20 minutes to produce a uniformly abraded surface. The surface is washed with acetone to produce a clean, dust free surface.

A transition layer is then formed consisting of an about 50-50 vol % mixture of the separate, well-blended matrix and metal alloy particles described above, but with all particles in the 10 to 45 micrometer size range by plasma spraying at a temperature well above 2000° C. to produce a strong conductive layer having a thickness of about 6 mils. The particles are fully melted during the plasma spraying.

The composite particles are then applied to the surface by plasma spraying with an SG-100 spray gun from Miller Thermal, Inc. During spraying, the composite particles are heated to a surface temperature of about 1000° C. so that only the outer portion of the particles are softened, assuring that the locations of isolated metal particles within the composite particles are not disturbed. An adherent, uniform composite coating of low electrical conductivity is formed having a thickness of about 45 mils and a surface finish of about 250AA results after light surface sanding. The coated sheet is subjected to extended temperatures of 875° C. and to repeated thermal cycling between about 500° C. and −55° C. without mechanical damage.

EXAMPLE II

Metal-ceramic particles are prepared as described in Example I. A quantity of pure matrix ceramic particles having diameters of about 20 micrometers is mixed with the composite particles to about 30 vol %.

A flat plate of 3-D carbon-carbon material is lightly sanded with 400 grit sandpaper and washed with acetone to assure a clean, dust free surface. All surfaces are plasma sprayed with the particle mixture at a temperature of about 900° C. until a layer having a thickness of about 45 mils is formed. The coated plate is briefly exposed to a temperature of about 1100° C. in air to assure that the surface layer is well melted. A uniform, smooth, adherent coating results that is virtually air tight. No significant oxidation of the carbon-carbon material occurs after 10 hours at 1100° C., with a weight change of only a few percent.

While certain specific materials, conditions and parameters were detailed in the above description of preferred embodiments, those may be varied, where suitable, with similar results. Other applications and ramifications of this invention will occur to those skilled in the art upon reading this disclosure. Those are intended to be included within the scope of this invention, as defined in the appended claims.

I claim:

1. The method for forming a magnetic-cermet dielectric coating on substrate surfaces which comprises the steps of:
    cleaning the surface to be coated;
    preparing a quantity of finely divided composite particles having diameters from about 60 to 75 micrometers, each composite particle comprising an electrically insulating ceramic matrix having a plurality of magnetic metal particles, having average diameters of from about 1 to 5 micrometers, spaced throughout the matrix, the metal particles making up from about 50 to 75 vol % of said composite particles; and
    plasma spraying said composite particles onto the surface to be coated at temperatures such that the composite particles are melted on their surfaces only;
    whereby a magnetic-ceramic dielectric layer is formed.

2. The method according to claim 1 further including the step of plasma spraying particles having substantially the same composition as said composite particles at a temperature sufficient to substantially fully melt the particles, to form a transition layer on said surface prior to spraying said dielectric layer, said transition layer having a thickness of from about 5 to 7 mils, whereby a conductive layer having a coefficient of thermal expansion intermediate those of the substrate and the dielectric coating is formed.

3. The method according to claim 1 wherein said particles used to form said transition layer have diameters of from about 10 to 45 micrometers.

4. The method according to claim 1 wherein said surface is metallic and said cleaning is accomplished by applying a degreaser to the surface, abrading the surface by directing alumina particles having diameters of from about 20 to 80 micrometers against the surface and washing the surface with a solvent that does not leave a residue.

5. The method according to claim 1 wherein said metal particles are formed from metal selected from the group consisting of iron, iron-aluminum, iron-silicon, cobalt and mixtures thereof.

6. The method according to claim 1 wherein said ceramic matrix material is selected from the group consisting of oxides of silicon, barium, aluminum, boron, calcium, strontium, potassium and mixtures thereof.

7. The method according to claim 1 wherein said ceramic matrix material consists essentially of about 45 wt % silicon dioxide, about 46 wt % barium oxide and about 9 wt % boron oxide.

8. The method according to claim 1 including the step of plasma spraying said composite particles onto the surface to form a coating having maximum microwave absorption at any frequency within the range from about 5 to 16 GHz.

9. The method according to claim 1 including the step of plasma spraying said composite particles onto the surface to form a coating having a thickness of from about 35 to 55 mils.

10. The method for forming a magnetic-ceramic dielectric coating on substrate surfaces which comprises the steps of:
    cleaning the surface to be coated;
    preparing a quantity of first finely divided composite particles having diameters from about 10 to 45 micrometers, each first composite particle comprising a first electrically insulating ceramic matrix having a plurality of first magnetic metal particles, having average diameters of from about 1 to 5 micrometers, spaced throughout the matrix, the first metal particles making up from about 50 to 75 vol % of said composite particles;
    plasma spraying said composite particles onto the surface to be coated at temperatures such that the composite particles are substantially completely melted to form an electrically conductive transition layer;
    preparing a quantity of second composite particles having diameters of from about 60 to 75 micrometers each second composite particle comprising a second electrically insulating ceramic matrix having a plurality of second magnetic metal particles, having average diameters of from about 1 to 5 micrometers, spaced throughout the matrix, the second metal particles making up from about 50 to 75 vol % of said composite particles; and
    plasma spraying said second composite particles onto the surface to be coated at temperatures such that the composite particles are melted on their surfaces only;
    whereby a magnetic-ceramic dielectric layer is formed.

11. The method according to claim 10 wherein the composition and physical characteristics, other than diameter, of said first and second composite particles are substantially the same.

12. The method according to claim 10 wherein said first and second metals are selected from the group consisting of iron, iron-aluminum, iron-silicon, cobalt and mixtures thereof.

13. The method according to claim 10 wherein said first and second ceramic matrix materials are selected from the group consisting of oxides of silicon, barium, aluminum, boron, calcium, strontium, potassium and mixtures thereof.

14. The method according to claim 10 wherein said first and second ceramic matrix materials consists essentially of about 45 wt % silicon dioxide, about 46 wt % barium oxide and about 9 wt % boron oxide.

15. The method according to claim 8 including the step of plasma spraying said second composite particles onto the surface to form a dielectric coating having maximum microwave absorption at any frequency within the range from about 5 to 16 GHz.

16. The method according to claim 10 wherein said first plasma spraying step forms a transition layer having a thickness of from about 5 and 7 micrometers and said second plasma spraying step forms a dielectric coating having a thickness of from about 35 to 55 mils.

* * * * *